Patented Dec. 11, 1951

2,577,734

UNITED STATES PATENT OFFICE 2,577,734

PLASTICIZED POLYVINYL ACETATE EMULSION

Howard C. Brinker, South St. Paul, Minn., assignor to Minnesota Mining & Manufacturing Company, St. Paul, Minn., a corporation of Delaware No Drawing. Application January 31, 1951, Serial No. 208,850

16 Claims. (Cl. 260—27)

This invention relates to materials for coating sheet materials, particularly paper and cardboard, to render them grease resistant or greaseproof, and for forming grease resistant or greaseproof films.

Polyvinyl acetate emulsion or dispersion is such a material but heretofore the known plasticizers for it necessary to render it suitable from the point of view of flexibility, have been unsatisfactory, primarily because they themselves must first be emulsified before they can be used. This requires an additional step in the process of manufacture; it also results in the water dilution of the polyvinyl acetate emulsion so as to render impossible the production of high-solids emulsions. It is of course well known that high-solids emulsions are highly desirable in coating processes. Many previous plasticizers have also been unsatisfactory because they are volatile, so as to be partially or wholly driven off if heat curing of the material which they are intended to plasticize, is employed.

Objects of the invention therefore include the provision of an inexpensive easily used plasticizer for polyvinyl acetate emulsion that will not dilute it, that is non-volatile and that will render it suitable for coating flexible porous sheet materials to render them greaseproof, and for forming grease resistant or greaseproof films.

The invention provides a plasticizer that contains an ester group and a free hydroxyl group. The ester group provides compatibility with the polyvinyl acetate and the hydroxyl group provides dispersability in emulsions.

More particularly the invention provides a partial ester of a polyhydric alcohol and abietic acid, such as a monoester of a glycol and an abietic acid from rosin, i. e., glycol monoabietate, an example of which latter may be prepared as follows:

| | Grams |
|---|---|
| Polyethylene glycol | 300 |
| Rosin | 300 |
| Ca(OH)$_2$ | 2 to 3 |

The polyethylene glycol in the above example has an average molecular weight of 300. The rosin is preferably gum rosin, but wood rosin may be used.

Heat at atmospheric pressure in a flask connected to a condenser and a water separator. Xylol is added in sufficient quantity for azeotropic removal of the water formed during esterification. The heated mixture may be stirred if desired and an inert gas blown through to keep out air and retain a light color. The water and xylol are drawn off as an azeotrope and condensed. The water is separated and the xylol returned to the flask.

The preferred temperature for esterification is 500° F.±15°. When 18 to 20 cc. of water has been separated the monoester is formed. The excess xylol is removed and the monoester is allowed to cool. The final product has an acid number of 35±15 and a viscosity at 70 to 75° F. of 1300±200 centipoises.

Any glycol may be used, those readily esterifiable with rosin being preferred. Examples of such include ethylene glycol, di ethylene glycol, tri ethylene glycol, etc.; propylene glycol, di propylene glycol, etc. The plasticizers from lowered molecular weight glycols tend to produce a product somewhat less flexible than when higher molecular weight glycols are used.

Other esterification catalysts such, for example, as zinc chloride, zinc acetate and sodium acetate may be used.

The above esterification products of glycol and rosin consist of stable liquid monoesters of rosin; have a terminal hydroxyl group at the end of a long chain; are soluble in organic solvents; are self dispersable in water as well as in emulsions of polyvinyl acetate and do not bleed therefrom; are non-volatile; have a low vapor pressure; have substantially no odor; are easily prepared. They are particularly suitable as plasticizers for polyvinyl acetate emulsion.

Examples of polyhydric alcohols in addition to the glycols, that may be similarly esterified with rosin to produce plasticizers for polyvinyl acetate emulsion, include glycerine, sorbitol, penta erythritol and mannitol.

The plasticizers of this invention may be added directly to polyvinyl acetate emulsions simply by warming slightly to lower the viscosity and then stirring into the emulsion.

They do not need themselves to be emulsified or otherwise treated. Polyvinyl acetate emulsions, thus plasticized, consequently remain undiluted.

The plasticized polyvinyl acetate emulsions of this invention form continuous films that are soft and flexible and may be coated onto flexible sheet material without materially lessening the degree of flexibility of the uncoated sheet. They are particularly suitable for coating sheet material to render it greaseproof or grease resistant; they may also be formed into self-sustaining films.

The term "grease" herein is intended to include mineral, animal and vegetable greases, fats and oils.

The application of the plasticized emulsion to sheet material may be made according to known coating procedure, e. g., it may be warmed slightly, coated onto the sheet material, and then dried either at room or elevated temperatures until it forms thereon a flexible film. The coating weight may vary.

Grease resistant barrier wrap or grease resistant barrier board suitable for the manufacture of grease resistant packages, cartons and containers, may be formed by coating the plasticized polyvinyl acetate emulsion on to paper or cardboard, respectively, and then drying. For such purposes the emulsion is preferably plasticized by adding approximately 20 parts of the plasticizer to approximately 100 parts of the emulsified polyvinyl acetate, the parts being by weight based on the total solids content. An average coating weight of 9 to 10 grains per 4" x 6" area and a drying temperature of 120° F. is satisfactory. The grease resistant barrier board may also be formed of laminations of the paper, the board, and the resinous coating or film.

The emulsion may be cast, extruded or otherwise formed, according to known procedures, into self-sustaining films.

This is a continuation-in-part of my copending application Serial No. 69,047 filed January 3, 1949, now abandoned.

I claim:

1. Polyvinyl acetate emulsion plasticized with a composition comprising an ester of a polyhydric alcohol and abietic acid having at least one unreacted hydroxyl group.

2. A flexible film comprising the dried residue of the composition of claim 1.

3. Sheet material coated with the composition of claim 1.

4. Grease resistant barrier board comprising cardboard coated with the composition of claim 1.

5. Polyvinyl acetate emulsion plasticized with a composition comprising a monoester of a glycol and abietic acid having a terminal hydroxyl group.

6. A flexible film comprising the dried residue of the composition of claim 5.

7. Sheet material coated with the composition of claim 5.

8. Grease resistant barrier board comprising cardboard coated with the composition of claim 5.

9. Polyvinyl acetate emulsion plasticized with a composition comprising an ester of glycerine and abietic acid having at least one unreacted hydroxyl group.

10. A flexible film comprising the dried residue of the composition of claim 9.

11. Sheet material coated with the composition of claim 9.

12. Grease resistant barrier board comprising cardboard coated with the composition of claim 9.

13. Polyvinyl acetate emulsion plasticized with a composition comprising an ester of sorbitol and abietic acid having at least one unreacted hydroxyl group.

14. A flexible film comprising the dried residue of the composition of claim 13.

15. Sheet material coated with the composition of claim 13.

16. Grease resistant barrier board comprising cardboard coated with the composition of claim 13.

HOWARD C. BRINKER.

REFERENCES CITED

The following references are of record in the file of this patent:

UNITED STATES PATENTS

| Number | Name | Date |
| --- | --- | --- |
| 2,343,091 | Smith | Feb. 29, 1944 |